United States Patent
Yeh

[19]

[11] Patent Number: 5,866,000
[45] Date of Patent: Feb. 2, 1999

[54] APPARATUS FOR SEPARATING DISPERSED LIQUID FROM A CONTINUOUS FLUID

[76] Inventor: George C. Yeh, 2 Smedley Dr., Newtown Square, Pa. 19073

[21] Appl. No.: 976,277

[22] Filed: Nov. 21, 1997

[51] Int. Cl.⁶ .................................................. B01D 17/038
[52] U.S. Cl. ........................ 210/295; 210/304; 210/493.4; 210/497.1; 210/512.1; 210/532.1; 55/459.1; 55/498; 55/520
[58] Field of Search .................................... 210/295, 304, 210/493.4, 497.1, 512.1, 532.1; 55/459.1, 498, 520; 209/715, 725

[56] References Cited

U.S. PATENT DOCUMENTS

| | | | |
|---|---|---|---|
| 4,662,613 | 5/1987 | Woog | 210/512.1 |
| 4,938,869 | 7/1990 | Bayerlein et al. | 210/497.1 |
| 5,338,450 | 8/1994 | Maurer | 210/304 |
| 5,565,101 | 10/1996 | Kuntz | 210/304 |

OTHER PUBLICATIONS

*Perry's Chemical Engineers' Handbook*, Sixth Edition, McGraw–Hill, Inc. ©1969, pp. 18–70 to 18–84.

*Primary Examiner*—David A. Reifsnyder
*Attorney, Agent, or Firm*—Howson and Howson

[57] ABSTRACT

A mixture of liquid particles dispersed in a fluid is introduced into an upright cylindrical separator at one end of an involute channel formed therein by a coaxial spiral partition of fibrous material to flow continuously under near plug-like flow conditions in an involutional or evolutional direction. The centrifugal force of the fluid in the channel causes the particles to impinge the fibrous material, separate from the fluid, and form films of the liquid which drains by gravity to a collection at the bottom of the separator.

23 Claims, 2 Drawing Sheets

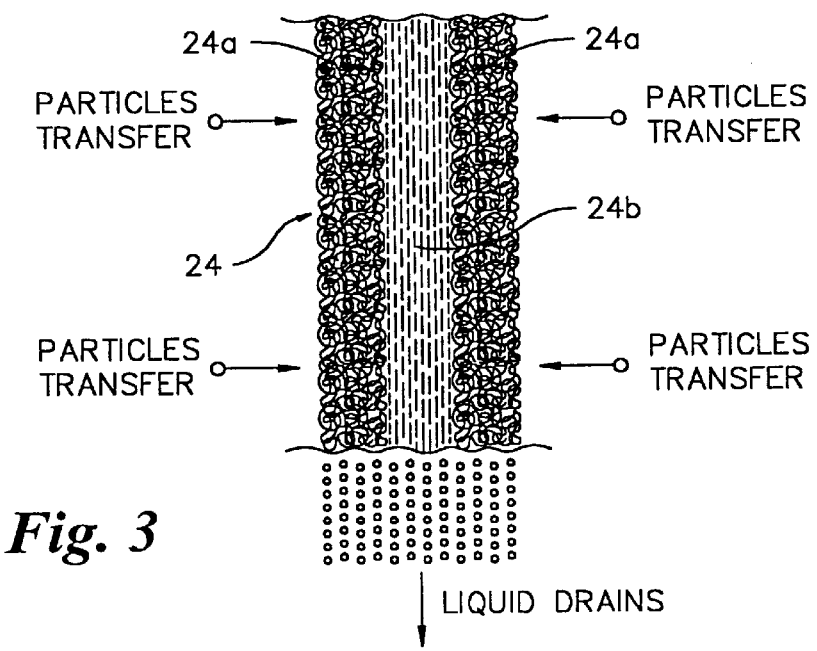
Fig. 3
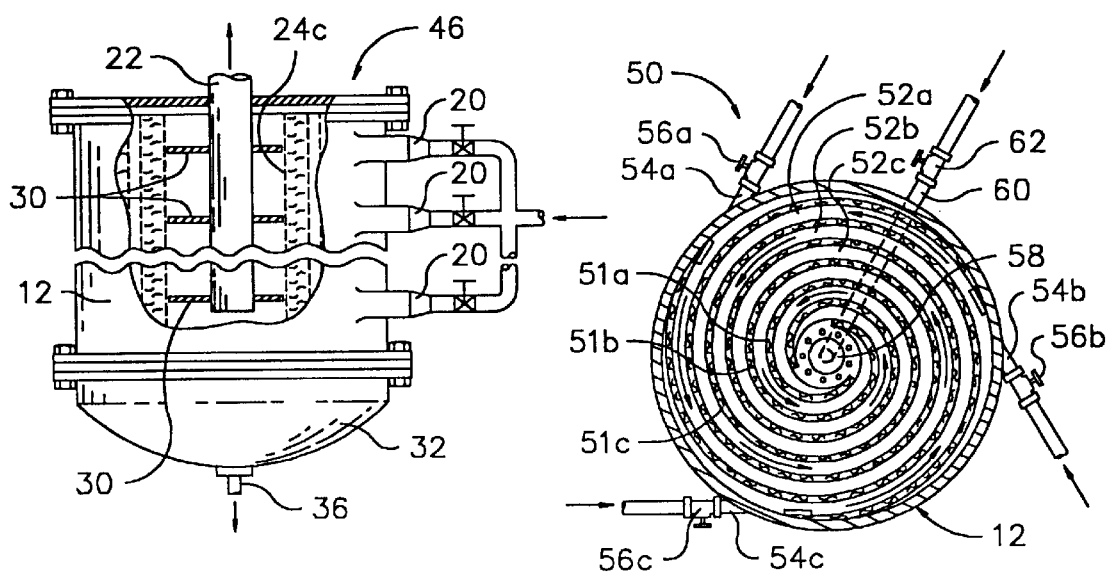
Fig. 4
Fig. 5

APPARATUS FOR SEPARATING DISPERSED LIQUID FROM A CONTINUOUS FLUID

BACKGROUND OF THE INVENTION

1. Field of the Invention

This invention relates generally to fluid separation, and more particularly to a new and improved method and apparatus for separating dispersed liquid from a continuous fluid.

2. Description of the Prior Art

Many industrial processes involve contacting operations where droplets or particles of liquid are dispersed in a gas phase or in another liquid phase in the form of a mist, fog, fume, droplets or similar dispersion. The particles may vary widely in size from several hundredths of a micron to several hundred micron and their separation is often necessary to recover or purify either or both the liquid and gas components.

Some of these processes generate gas streams containing valuable entrained organic liquid compounds such as alcohols and petrochemicals, or they create hazardous workplaces with liquid particles of acids, ammonia, oils, etc. entrained in the air. Sources of oil mist, for instance, may be derived from compressed air and machine shops. Another process involves erosion of steam turbine impellers by water particles contained in steam. To prevent the particles from forming, the steam is superheated but at a significant waste of energy. There are also many industrial examples in which a dispersed liquid must be removed from a continuous liquid. Oil spills in streams, lakes, etc. and oily contaminants in drinking water are good examples.

Various devices for the physical separation of liquid particles entrained in a gas or another liquid utilize differences in physical properties such as particle size, density, velocity, wettability, and electric and magnetic characteristics. One device generates a centrifugal force to remove the liquid particles by increasing their inertial velocity in a rotating device, especially of large or heavy particles. However, this is usually not suitable for the separation of liquid particles in a gas because they may break up and vaporize upon contact with the rotating device.

Electric or magnetic force fields are also applied to liquid particles to remove them from a gas or another liquid. Electrostatic precipitation for example, effectively separates submicron-size liquid particles from a gas stream, but because of the large size of equipment required the capital investment is generally high and it is not applicable to combustible mixtures. Other electrostatic methods of separation, such as electrostatic adsorption, electrostatic filtration, electrostatic repulsion, electrostatic double-layering, elestrophoresis etc. have drawbacks similar to the above mentioned.

Another form of separator is the scrubber. It utilizes a spray chamber, spray cyclone or packed tower, in which a stream of water impinges the particles on solid surfaces. These forms can be effective for separating liquid particles insoluble in water, but it generates waste water which must also be treated before it is discharged into the environment.

Particles several microns and larger can be separated by gravity settling, direct interception and inertial deposition while smaller sub-micron particles are collected by Brownian diffusional deposition inside a fiber bed. However, the size of this type of separator is relatively large and usually requires a long particle residence time and/or high gas pressure.

Another form of separator employs a screen or filter such as a sieve, septum, or membrane in which impingement surfaces retain the liquid particles and allow the gas to pass. The particles, with their inertial forces due to the gas, strike and adhere to solid surfaces. This form is not very effective because the particles accumulated near the solid surface can prevent further flow of the gas through the screen or filter and allow the particles to reentrain if the gas velocity is high. The efficiency is also limited because the gas back-mixes inside the separator lowering the net separation rate of the particles. Furthermore, the size of equipment is relatively large for dilute mixtures.

Conventional impingement separators exist in a wide variety of forms such as disclosed in *Perry's Chemical Engineers' Handbook. Sixth Edition*, McGraw-Hill, Inc. ©01969, pp. 18-70 to 18-84. The simplest form consists of a nozzle and target of solids or a container of inert packing material through which the liquid particles and gas slowly pass. The particles impinge and collect on the solids or packing material and are removed in a route separate from the gas stream. Examples of other forms are jet impactors, wave plate separators, staggered channels, vane-type mist extractors, zigzag plate separators, staggered vane separators, baffle separators, and wire-mesh de-misters.

Impingement separators are best suited for large entrained liquid particles moving at high velocities. The efficiencies are low because there is back-mixing of flowing gas and reentrainment of the particles. Efficiencies in the range of 20% to 70% are typical in industrial operations.

For the impingement separation of fine mists or fog with liquid particles less than one micron in diameter, a cylindrical bed of randomly packed fibrous materials such as glass or polypropylene lining the inside of a vertically disposed cylindrical separator is used. The liquid-gas mixture is introduced through a side-wall, passes through the fibrous bed under pressure. The liquid particles impinge on the fibrous material and coalesce to form a continuous film which drains by gravity out the bottom of the separator while the gas exits through the top. Liquid particles one micron and larger move in the gas according to Stokes' law and separate readily from the gas upon impingement. Smaller particles move more slowly through the material in a random motion close to Brownian movement. On the average, all of the particles travel across a distance equal to half the inside diameter of the cylinder. For. mixtures having a wide range of liquid particle sizes, a larger filter area, longer residence time, and higher gas pressure are required to maintain the same separation efficiency and throughput capacity. Several impingement beds placed in series may be needed to improve efficiency, or placed in parallel to increase throughput capacity. The trade-off is more capital investment and higher operational costs.

Efforts to improve the separation efficiency of the cylindrical impingement separator have been tried by placing a fan inside the unit or rotating the cylindrical impingement filter inside in order to generate more dynamic conditions and greater centrifugal force in the gas as it flows through the fibrous bed. The fan and the rotational motion break up and vaporizes the liquid particles creating a large amount of liquid vapors in the treated gas stream. The separation efficiency of the unvaporized liquid particles may be higher but separation of the total liquid component in the gas is lower.

Some liquid particle-gas separators use both impingement and centrifugal force. One separator of this type has a number of target plates arranged in a circular fashion inside a cylindrical tank. The wet gas flows in a vortex through the spaces between the plates to produce a greater impingement effect. The separator is frequently used for treating wet steam. The steam enters the tank tangentially near the top and leaves through a central outlet, while liquid is drained from the bottom of the separator. Another type has a rotating surface which produces a vortex of the liquid particle-gas mixture before it impinges on target plates on the inside wall of a cylindrical tank. The mixture enters at the top, the gas leaves at the bottom, and the liquid particles are drained from a separate outlet near the bottom. Still another type separator has a curved baffle which creates a vortex of the incoming liquid particle-gas mixture at the top of a cylindrical tank and directs it toward target plates arranged on the inside wall for impingement. Liquid particles are drained from the bottom of the separator. Each of these separators is only effective for separating large liquid particles and not for a fine liquid mist or fog because the fine particles move at very low velocities with little or no centrifugal force. While the separation efficiency of liquid particles larger than one micron may be improved by combining centrifugal force with impingement, the investment in capital is comparatively large.

From all of the above, it is apparent that the turbulence and back-mixing of fluid inside conventional impingement separators are pervasive problems because of reentrainment of particles and low separation efficiency. Low flow rates or large residence time of gas reduces turbulence and back-mixing, but at the expense of throughput capacity. Larger equipment may handle larger flow rates, but the travel distance for the particles is increased making the equipment less efficient. Parallel or series arrangements of an equipment increases capital and operational costs. Higher operational pressures increase the transfer rate of very small particles that move by the Brownian motion, but at the expense of higher capital costs. Separation equipment designed for separation of large particles is not effective for separation of small particles, such as in a fog or fume. Impingement filters may be designed for separating particles of a wide size range, but only for very slow flow rates or very high residence time required for small particles. Centrifugal force is beneficial for impingement of large particles, but the rotating equipment used to produce the force can break up and vaporize liquid particles in contact.

Most separation principles for liquid-gas mixtures are equally applicable to separation of liquid-liquid mixtures in which one or more liquids are dispersed in another liquid except that the design and the operation of conventional separation equipment varies greatly from that for gas-liquid mixtures. Early conventional separation technology is based on coalescence by impingement followed by simple phase separation. It is effective only for separation of larger droplets, and requires a large residence time since liquid turbulence will redisperse once coalesced particle. Furthermore, the equipment must provide a large surface area for a greater rate of impingement and a shorter distance for short particle transfer times. The capital and operational costs of this technology are relatively low.

Flotation and foam separation using coagulating and flocculating agents or foaming agents are very effective and could achieve complete separation of liquid-liquid mixtures containing a very fine dispersed liquid if the turbulence and back-mixing of the liquid mixture were prevented.

For the separation of sub-micron size dispersed liquids, industry widely and very effectively uses centrifugation and membrane separation. However, at high-speeds the expenditure is relatively high. Membranes used for microfiltration are usually made specifically for a given system for best results. In membrane filtration, only the continuous fluid is allowed to pass while the dispersed liquid particles blocked by the membrane accumulate in the fluid mixture being treated. Consequently,. pressurization of the fluid being treated and/or vacuuming of the treated liquid are often required with all attendant increases in costs of equipment and maintenance.

Electric or magnetic force fields can also be used to separate liquid-liquid mixtures, although the separation rates are usually very slow due to higher viscosities of liquid-liquid mixtures. In order to increase the separation rate and efficiency, the particle transfer distance must be shortened and the contacting surface must be increased. Furthermore, liquid turbulence inside the equipment must be prevented completely for the separation to take place. Therefore, solid surfaces and high surface-potential fields are often used for generating electrostatic attraction or repulsion forces for separation, instead of using low external fields in the liquid. Capital and operational costs of electric and magnetic separators are relatively high.

SUMMARY OF THE INVENTION

It is therefore an object of the present invention to provide a novel and improved method and apparatus for simultaneously separating liquid particles of all size ranges entrained in a fluid at a high and constant rate in a short residence time.

Another object of the invention is to provide an improved method and apparatus for separating liquid particles from a fluid without reentrainment.

A further object is to provide a simple liquid-fluid separator which operates at a high separation rate and capacity by centrifugal force of the fluid without breaking or vaporizing liquid particles.

A further object is to provide a simple, compact impingement separator for a liquid particle and fluid mixture having a short particle transfer path and a large impingement area.

Still another object of the invention is to provide an improved particle separation apparatus which requires low capital investment and operational costs.

Briefly, these and other objects of the invention are achieved in a liquid particle-fluid separation apparatus comprising an enclosed upright cylindrical container having at least one coaxial involute partition of fibrous material forming an involute flow channel. A mixture of liquid particles dispersed in fluid, introduced tangentially through an outer inlet port near the top of the container into the outer end of the channel, flows inwardly with increasing angular and radial velocities through the channel under plug-flow conditions without back-mixing, and discharges through a central outlet port at the inner end of the channel. The centrifugal force of the fluid increases as it flows toward the inner end where it is needed most for the impingement of small liquid particles left in the fluid. The mixture passes through both sides of the partition with the liquid particles impinging on the fibrous material. The particles coalesce to form a continuous liquid film which drains by gravity through the fibrous material to the bottom of the container. The fluid component is discharged through the top of the container by a centrally located conduit.

In a reverse (evolutional) mode of operation, the liquid particle-fluid mixture is introduced through the central port, flows through the involute channel in the opposite direction with decreasing angular and radial velocities, and exits tangentially from the outer port. The centrifugal force is most effective near the inner end of the channel where impingement of large particles on the fibrous material is strongest. Near the outer end the force is weakest and has less effect on impingement of small particles remaining in the fluid. As in the involutional flow mode, after impingement, liquid particles coalesce to form a continuous liquid film which drains by gravity through the central part of the fibrous material to the bottom of the separator.

Whether the fluid flows involutionally or evolutionally, all the particles are accelerated without them breaking up and vaporizing. Large particles accelerate more than small particles and therefore impinge more readily upon initial contact with the fibrous surfaces, and have a sweeping effect on the small ones further increasing the separation rate.

BRIEF DESCRIPTION OF THE DRAWINGS

For a better understanding of the nature and objects of the invention, reference will be made to the following detailed description taken in conjunction with the accompanying drawings wherein:

FIG. 3 represents a fragmentary portion of a spiral partition employed in the separator of FIG. 1;

FIG. 4 is a view in elevation, partially cut away, of a second preferred embodiment of a liquid particle-fluid separator utilizing multiple inlet ports in a single involute flow channel according to the invention; and FIG. 5 is a view in transverse cross-section of a third preferred embodiment of a liquid particle-fluid separator utilizing multiple involute flow channels according to the invention.

DESCRIPTION OF THE PREFERRED EMBODIMENTS

The present invention operates on the principle of impingement separation. A mixture of liquid particles entrained in a fluid, gas or another liquid, flows under plug-like flow conditions through a unique involute flow channel defined by an involute partition constructed of fibrous material. Under the influence of centrifugal force the liquid particles impinge the fibrous material from either or both exposed sides of the partition and coalesce to form liquid films. The films drain from the fibrous material into a receiver from which it is discharged. The plug-like flow conditions prevent back-mixing and turbulence and reentrainment of liquid particles which have been separated from the fluid.

The effect is somewhat analogous to a cyclone separator. The solid particles separated from whirling gas stay close to a conical wall as the particles descend under centrifugal and gravity forces to an outlet at the bottom. In the present invention the involute partition acts like the conical wall and the involute flow acts like the vortex of a cyclone except that liquid particles separated from the fluid wet the fibrous partition and coalesce to form liquid films which collect in a receiver and discharges.

The involute partition enables plug-like flow of the fluid to occur with maximum separation of liquid particles. The fluid velocity and the residence time in the flow channel are inversely proportional to each other for a given separator design and may be set at various values to promote a desired rate controlling mechanisms of particle deposition such as direct interception, inertial deposition, diffusional deposition or gravity settling. The residence time is equal to the ratio of channel length to velocity, and equal to the ratio of channel volume to fluid volumetric flowrate. These conditions remain consistent over the entire length of the channel at a given flow rate, since the radial and tangential components of the flow pressure in the fluid are approximately balanced at all times due to the conservation of angular momentum.

Figure 1:
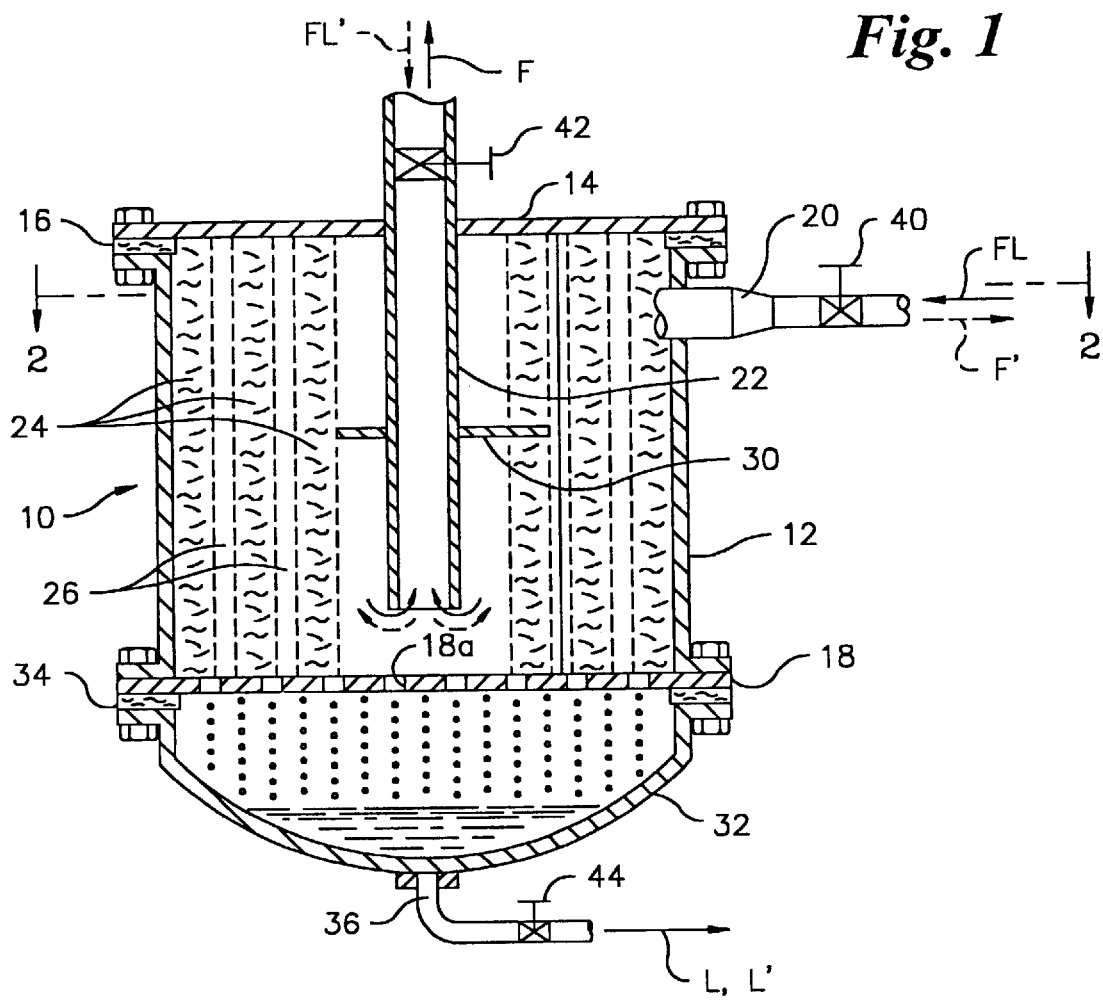
FIG. 1 is an elevation view in longitudinal cross section of one preferred embodiment of a liquid particle-fluid separator utilizing a single involute flow channel according to the invention.
Figure 2:
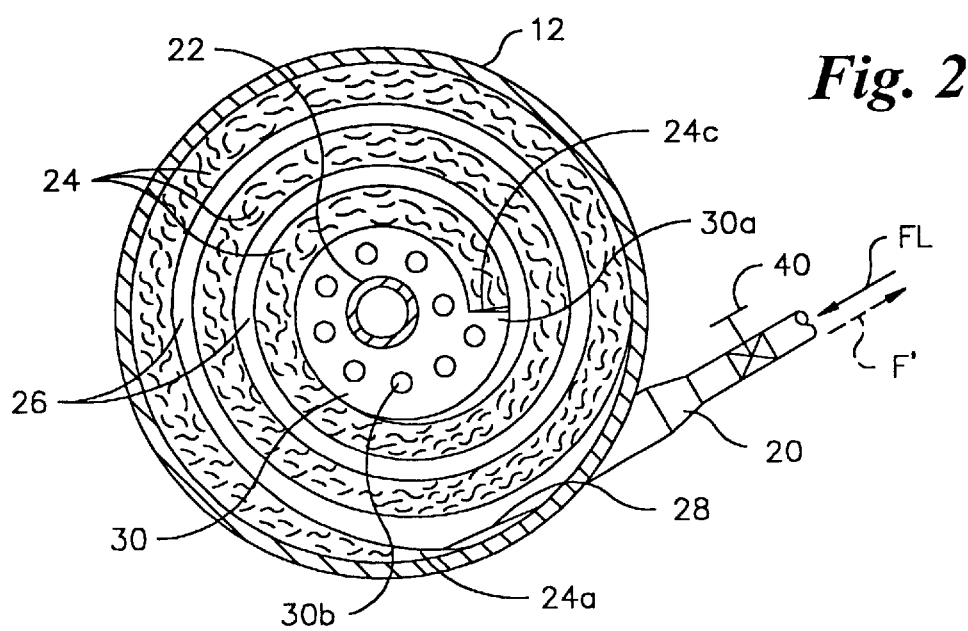
FIG. 2 is a transverse cross-sectional view of the separator taken along the line 2—2 of FIG. 1.

Referring now to the drawings wherein like referenced characters and numerals designate like or corresponding parts throughout the several views, there is shown in FIGS. 1–3 one preferred embodiment of a liquid particle-fluid separator 10 utilizing a single involute flow channel. It includes an upright cylindrical wall 12 closed on top by a cover plate 14 and an annular seal 16, and enclosed at the lower end by a plate 18 with openings 18a. An inlet port 20 near the top of wall 12 is angularly positioned to direct the mixture tangentially into separator 10, and a central conduit or pipe 22 extends through cover 14 from a position near plate 18 to provide an outlet for separated fluid from the liquid particles.

A spiral-wound or involute partition 24 of fibrous material formed about the cylindrical axis of wall 12 extends between plates 14 and 18 and radially divides the interior of separator 10 into a single narrow involute flow channel 26. Partition 24 has outer end 24a secured between wall 12 and a narrow guide plate 28 which extends vertically between plates 14 and 18 adjacent to inlet port 20. Plate 28 projects from wall 12 at an angle suitable for tangentially directing the mixture from port 20 smoothly into the path of flow channel at the outer end 24a. An inner end 24b terminates near the cylindrical axis of cylinder wall 12 at stabilizer disk 30 which is fixed in a horizontal plane about pipe 22 intermediate the ends of wall 12. A shoulder 30a on the perimeter of disk 30 engages inner end 24b for holding partition 24 in a predetermined aligned and stabilized position and holes 30b in the disk allow the fluid and matter unrestricted flow within separator 10.

The dimensions of involute flow channel, i.e. width, height and total length, determine the fluid flowrate and residence time required for a given separation process, and the total length of the channel determines the number of involutions and flow channels.

An inverted dome-shaped well 32 is secured with an annular seal 34 around the perimeter of the lower side of plate 18 with a central conduit or outlet 36 at the lowest point for allowing discharge of liquid and any solid sediment collected in well 32. A cone-shaped well would serve equally as well as the dome-shape.

An inlet valve 40 at inlet port 20 and a gas outlet valve 42 on pipe 22 control the flow rate and backpressure of fluid in flow channel 26. A drain valve 44 at outlet 36 controls the level of liquid removed from the fluid in well 32 to assure no other fluid can escape through outlet 36.

Referring to FIG. 3, involute partition 24 comprises a bed of fibrous impingement material. It is preferably constructed of a laminate of two outer layers 24a of thin randomly aligned fibers and a middle layer 24b of loosely packed vertically aligned fibers, such as of fine glass, polypropylene or tetrafluoroethelene (TFE). For some liquid particles, a single layer of random fibers may be sufficient. Without middle layer 24b, a film of liquid drains more slowly down on the surfaces of the randomly packed fibers. In any case the fibers should be wettable by liquid particles in order for the particles to coalesce into a film. Therefore a solid material with a negligible wetting angle is preferred. Since liquid molecules and solid molecules interact with each other by either electrostatic interaction and/or dispersion interaction, both the dielectric constant (or surface tension) and the viscosity of the liquid may also be used as a guide to predict its interaction with a given fiber. For effective separation of a liquid-liquid mixture the fibrous material chosen should be preferentially wetted by the dispersed liquid. For example, an oil-in-water mixture can be separated using TFE fibers.

In operation of separator 10, the mixture of fluid containing liquid particles, as shown by arrow FL, enters separator 10 tangentially through inlet port 20 and flows under plug-like flow conditions involutionally through channel 26 as the liquid particles move toward both sides of partition 24. The particles impinge and wet the fibrous material of partition 24 and form liquid films on the random fibers of outer layers 24a and drain through large capillary interstices of the vertically aligned or loosely packed fibers of middle layer 20b. The liquid film then drains through openings 18a in plate 18 into well 32. The rate of liquid discharge, as show by arrow L, from drain outlet 36 is controlled by valve 44 to maintain a liquid level seal above outlet 36 to prevent the other fluid from escaping with the liquid. The fluid component F is discharged through the top of separator 10 by centrally located pipe 22.

If desirable, liquid particles and fluid mixture may flow through involute channel 26 in the opposite direction to operate in an evolutional plug-flow manner. The mixture FL' is introduced through central pipe 22 and flows outwardly toward port 20. As the liquid particulate impinges the fibrous material in partition 24, the fluid F' separates and is discharged tangentially from port 20. The films of liquid L' coalescing in partition 24 drain to outlet 36 as described above for involutional operation. Impingement of large particle occurs with large centrifugal force near the center of separator 10 and residual small particles impinge with less force at the outer end.

For very large fluid flows the separator may be equipped with more than one involute flow channel. The cross-sectional plan view in FIG. 5 shows a liquid particle separator 50 equipped with three involute partitions 51a, 51b, 51c arranged in parallel to form three involute flow channels, 52a, 52b and 52c. The outer end of each channel has a tangential inlet port 54a, 54b, 54c, respectively, equipped with a valve 56a, 56b, 56c. The mixture of liquid particles and fluid enter the three inlet ports simultaneously and flows through the three flow channels at the same rate. Separated fluid leaves by a center outlet pipe 58 to discharge through an outlet valve (not shown). A drain outlet 60 and valve 62 allow the liquid to be discharged from a bottom well (not shown). Separator 50 with three flow channels operates in the same manner as the separator of FIG. 1. The number of flow channels may be varied according to specific separation requirements and the separator can be operated for evolution flow as well.

For a very large flow rate or tall container, vertically spaced inlet ports may be provided for each flow channel and multiple disks spaced apart along the length of the central pipe may be equipped for additional rigidity of each partition wall.

Referring to FIG. 4, a cylindrical separator 46 includes multiple of disks 30 spaced apart along the length of central pipe 22 for additional rigidity to the inner end 24c of the partition, and vertically spaced apart inlet ports 20 for greater flow distribution.

The thickness of partition 24, the width and the number of involutes flow channel 26, and the height of separator 10 may be varied to meet the separation conditions required. In general, a thick partition 24 affords greater impingement and separation efficiency, and a narrow flow channel 26 provides shorter particle travel distance to the partition 24 and thus faster separation. In most industrial application, the thickness of the fibrous bed may vary in a range between a few millimeters and several centimeters; and the width of a flow channel in approximately the same range. For example, the distance of particle transfer may be made very short and the area for liquid particle impingement made very large per unit volume of separator 10. Cylindrical wall 12 may be made very tall if necessary. Thus, the throughput capacity of the separator can be varied over a wide range without resorting to additional equipment. For a very large flow, a large separator may be constructed with more than one involute partition and flow channel.

For additional rigidity, partition 24 may be constructed with a layer of rigid material in the middle of the fibrous material, or with the fibrous material on one side and a non-porous rigid material on the other side. In the latter case, the liquid particles dispersed in the fluid being treated impinge on both sides of the partition. On the fibrous material side, the liquid particles form liquid films and drain inside the material, but on the nonporous side the liquid particles will wet the partition surface after impingement and form liquid films which drain down the surface to plate 18.

Since the design and construction of the present invention is very simple and the throughput capacity is very large, the investment in particle separation equipment provided by the present invention is low. It requires no power to operate and starts working as soon as a fluid to be treated is introduced. Unless the fluid contains solid particles, there is little required maintenance. Maintenance free operation is also possible by removing any solid particles contained in the fluid by conventional means prior to being introduced into the separator. However, a minimum of maintenance is usually required if the fluid contains dust or other forms of solid particles which might accumulate over time on surfaces of the involute partition and block impingement of liquid particles. Solid deposits can be removed by washing the partition off with water or by running a liquid capable of dissolving the solid through the flow channel.

There are several important considerations for successful practice of the invention. For a given fluid flow and a known liquid particle content, the material and thickness of the fiber-beds and the dimensions (width, height and length) of the flow channel determines the fluid residence time which may vary as the rate-controlling mechanism of particle separation varies. The rate-controlling mechanism for each liquid particle separation is predetermined by experimentation. If the required length of the flow channel is very large, multiple flow channels may be used. The dimensions of the involute partition may be determined experimentally so that the highest separation efficiency can be obtained.

From the above, it is apparent that the separation technique based on coalescence by impingement followed by phase separation is simplest in principle and most economical. It can be very effective for separation of very fine liquid particles, if it could be designed to provide a means for preventing the redispersion and reentrainment of liquid particles. The absence of fluid turbulence and back-mixing in the separator prevents reentrainment of liquid particles and results in very high separation efficiencies for most industrial applications. The large contacting area and duration and the small particle transfer distance produces very rapid particle separation rates for small size separators. Due to the cross-flow of fluid, small amounts of solid particles contained in the fluid will remain in the fluid or separate simultaneously with liquid particles without the need for another solid particle separator.

The separators according to the invention are very simple in design. There are no moving parts to operate, and requires no electricity or chemicals, and can be easily installed in a fluid line.

Other applications according to the invention than those described are possible. For example, it can be used for dehumidifying air, in air conditioning systems, vapor recovery with cooling, aerosol removal, and removal and digestion of bacteria by adding a bactericide to the impingement fiber-bed or in the liquid receiver of the apparatus. It can separate oil-water mixtures that are hard to separate by the conventional means.

The separator according to the invention is suitable for use with additional pressurization, vacuuming, cooling, condensation, etc. with little or no design modifications. Needless to say, the recycling of treated fluid by the separator is practical if desirable. As previously noted, the invention can be used for simultaneous separation of particles of all sizes by choice of material and by design of the involute wall, involute flow channel dimensions, and fluid flow conditions.

It will be understood that various changes in the material and design of parts, which have been described and illustrated in order to explain the principles of the invention, can be made by those skilled in the art within the principle and scope of the invention as described in the appended claims.

I claim:

1. Apparatus for separating liquid particles dispersed in a fluid comprising, in combination:
   a container having an upright cylindrical exterior wall having a longitudinal axis, a bottom wall with at least one opening, and a removable top cover;
   at least one upright involute partition of fibrous material extending from said bottom wall to the top of said exterior wall, said partition having an outer end joining with said exterior wall and an inner end terminating near the longitudinal axis to form an involute channel with an outer opening and an inner opening;
   an inlet port communicating with one of said openings of said channel below the top of said partition for admitting the liquid particles and fluid into said channel;
   a first outlet port communicating with the other of said openings of said channel below the top of said partition for discharging the fluid separated from the liquid particles; and
   a receiver connected to said container for receiving the liquid draining from said partition and through said bottom wall as a result of impingement of the liquid particles with said fibrous material.

2. Apparatus according to claim 1 wherein:
said first outlet port includes a pipe coaxial with said container extending through said top cover from near said bottom wall.

3. Apparatus according to claim 1 further comprising:
a second outlet port connected to said receiver, and a first valve for regulating the level of the drained liquid inside said receiver.

4. Apparatus according to claim 2 further comprising:
a second valve connected to said pipe for regulating the fluid discharge rate and pressure inside said container.

5. Apparatus according to claim 1 wherein:
said partition includes two layers of randomly packed fibers for impingement of the liquid particles, and a layer of capillary material between said two layers for draining the liquid films formed by coalescing of the liquid particles.

6. Apparatus according to claim 1 wherein:
said partition defines a spiral about the longitudinal axis.

7. Apparatus according to claim 1 wherein:
said inlet port is positioned tangentially relative to said exterior wall for introducing the fluid and dispersed liquid particles smoothly into the involute channel.

8. Apparatus for separating dispersed liquid particles from a fluid, comprising in combination:
an upright cylindrical wall having a longitudinal axis and enclosed by a bottom wall with holes, and a removable top cover;
at least one upright involute partition of fibrous material extending from said bottom wall to the top of said exterior wall, said partition having an outer end joining with said exterior wall and an inner end terminating near the longitudinal axis to form an involute channel with an outer opening and an inner opening;
a first port communicating with said inner opening of said channel below the top of said partition;
a second port communicating with the outer opening of the partition bellow the top of the partition;
and a third port communicating with said inner end of said channel through said holes.

9. Apparatus according to claim 8 wherein:
said second port is positioned tangentially to said exterior wall for smoothly discharging of the fluid separated from the liquid particles.

10. In an improved apparatus for separating dispersed liquid particles from a fluid, said apparatus including a closed tank having a closed flow channel, an inlet port at one end of the channel for receiving the fluid and dispersed liquid particles, a first outlet port at the other end of the channel for discharging fluid separated from said dispersed liquid particles, and a means for discharging the dispersed liquid particles separated from the fluid; the improvement comprising:
an upright involute means of fibrous material extending from the bottom of the tank to the top of the tank and having an inner end terminating a radial distance from the center of the tank for directing the fluid and liquid particles in an involute path.

11. Apparatus according to claim 10 wherein the improvement further includes:
collector means connected to the bottom of said tank for receiving liquid draining from said involute means;
a second outlet port located at the bottom of said collector means for discharging the liquid therefrom; and
a valve connected to said second outlet port for regulating the level of the liquid in said collector means.

12. Apparatus for separating dispersed liquid particles from a fluid, comprising in combination:
a closed upright cylindrical container having a cylindrical side wall, an involute partition of fibrous material for impinging said particles, said partition extending from a bottom wall to a top wall of said container, said partition having an outer end joining with said cylindrical side wall and an inner end terminating a radial distance from the center of the container to form a generally involute closed flow channel with an outer opening and an inner opening;

first means communicating with the outer opening of said channel for receiving the particles and fluid;

second means communicating with the inner opening of said channel for discharging the fluid separated from said liquid particles;

third means for receiving liquid draining from said partition formed by impingement of the particles in said partition; and fourth means for regulating the level of liquid inside the third means.

13. Apparatus according to claim 12 wherein: said bottom wall includes openings for allowing the liquid to drain into said third means.

14. Apparatus according to claim 12 wherein:

said first means is positioned peripherally for admitting the fluid and liquid particles tangentially into the said container; and said second means is located at the center of said container for producing involutional flow through said channel.

15. Apparatus according to claim 12 wherein:

said second means is at the bottom center of said container for admitting fluid and separated particles thereto; and said first means directs effluent from said container for imparting evolutional flow through said channel.

16. Apparatus for separating liquid particles dispersed in a fluid comprising, in combination:

an upright cylindrical container having a longitudinal axis and enclosed by a cylindrical side wall, a top wall and a bottom wall;

an involute partition of fibrous material within said container disposed between said top wall and said bottom wall, about the longitudinal axis of said container forming an involute flow channel with an outer opening and an inner opening first port means in said cylindrical side wall communicating with said outer opening;

second port means in said bottom wall communicating with said inner opening; and third port means in said top wall communicating with a central section of said container.

17. Apparatus according to claim 16 wherein:

said fibrous material includes a bed of randomly packed fibers wettable by said liquid particles for coalescing into liquid films in said partition.

18. Apparatus according to claim 17 wherein:

said bed further includes a layer of loosely packed fibers having larger pores than said randomly packed fibers and being between layers of said randomly packed fibers.

19. Apparatus according to claim 18 wherein:

said fibers are of a group consisting essentially of fine glass, fine tetrafluoroetheylene (TFE) and fine polypropylene.

20. Apparatus according to claim 19 wherein:

said third port includes a conduit coaxial with said container and extending through said top wall from near said bottom wall.

21. Apparatus according to claim 16 wherein:

said first port means includes an inlet conduit tangentially deposed on said side wall for maintaining a smooth flowpath of the fluid and liquid particles into said channel; and a first valve in said conduit for controlling the input flowrate of the fluid and liquid particles.

22. Apparatus according to claim 16 wherein:

said second port means includes an opening in said bottom wall communicating with a well for collecting the separated liquid particles.

23. Apparatus according to claim 22 wherein:

said second port means further includes a drain conduit communicating with said well; and a second valve in said drain conduit for regulating the level of the liquid collected in said well-above the opening of said bottom wall.

\* \* \* \* \*